US009489572B2

(12) United States Patent
Mélinand et al.

(10) Patent No.: US 9,489,572 B2
(45) Date of Patent: Nov. 8, 2016

(54) SYSTEM AND METHOD FOR RECOGNIZING GEOMETRIC SHAPES

(71) Applicant: Vision Objects, Nantes (FR)

(72) Inventors: Robin Mélinand, Carquefou (FR); Florent Buisson, Nantes (FR)

(73) Assignee: MYSCRIPT, Nantes (FR)

( * ) Notice: Subject to any disclaimer, the term of this patent is extended or adjusted under 35 U.S.C. 154(b) by 0 days.

(21) Appl. No.: 14/558,181

(22) Filed: Dec. 2, 2014

(65) Prior Publication Data

US 2016/0154998 A1   Jun. 2, 2016

(51) Int. Cl.
  *G06K 9/00* (2006.01)
  *G06F 3/0488* (2013.01)
  *G06T 11/60* (2006.01)
  *G06T 11/20* (2006.01)

(52) U.S. Cl.
  CPC ....... *G06K 9/00422* (2013.01); *G06F 3/04883* (2013.01); *G06K 9/00402* (2013.01); *G06T 11/203* (2013.01); *G06T 11/60* (2013.01)

(58) Field of Classification Search
  CPC .. G06K 9/00422; G06K 9/222; G06T 11/60; G06T 11/203; G06F 3/04883; G06F 3/033; F02B 2075/025; G09B 5/065
  USPC ....... 382/189, 107, 120, 123, 188, 203, 214, 382/253, 290, 309, 321; 345/418, 419, 420, 345/440, 441; 700/90, 95, 117, 159, 180, 700/182; 716/50, 51, 52, 122; 359/556, 359/554, 555
  See application file for complete search history.

(56) References Cited

U.S. PATENT DOCUMENTS

| 5,544,265 A | 8/1996 | Bozinovic et al. |
|---|---|---|
| 5,596,656 A | 1/1997 | Goldberg |
| 5,809,267 A | 9/1998 | Moran et al. |
| 5,880,743 A * | 3/1999 | Moran .................... G06T 13/80 345/473 |
| 6,233,351 B1 | 5/2001 | Feeney et al. |
| 6,292,190 B1 | 9/2001 | Corn |

(Continued)

FOREIGN PATENT DOCUMENTS

| EP | 1355275 | 10/2003 |
|---|---|---|
| EP | 1030263 B1 | 5/2004 |

(Continued)

OTHER PUBLICATIONS

Nritten Opinion and International Search Report issued for PCT/EP2015/002400 dated Mar. 24, 2016.

*Primary Examiner* — Sheela C Chawan
(74) *Attorney, Agent, or Firm* — McDermott Will & Emery LLP

(57) ABSTRACT

A system and method that is able to recognize a user's natural drawing of geometric shapes. The system and method is able to process single-stroke and multi-stroke geometric shapes. It can also apply implicit and user defined constraints to the geometric shapes. The system and method applies these constraints at the vector component level rather than the primitive level. It does this by breaking down both the geometric shapes and constraints on a vector component level. This allows the system and method to handle a larger number of geometric shapes and constraints. After applying the constraints to the geometric shapes at the vector component level, the system and method outputs smooth geometric shapes that incorporated both the implicit and user defined constraints.

37 Claims, 12 Drawing Sheets

(56) References Cited

U.S. PATENT DOCUMENTS

| | | |
|---|---|---|
| 6,411,732 B1 | 6/2002 | Saund |
| 6,459,442 B1 | 10/2002 | Edwards et al. |
| 6,476,834 B1 | 11/2002 | Doval et al. |
| 7,256,773 B2 * | 8/2007 | Kolmykov-Zotov G06F 3/04883 178/18.01 |
| 7,324,691 B2 | 1/2008 | Li et al. |
| 7,352,902 B2 | 4/2008 | Li et al. |
| 7,385,595 B2 | 6/2008 | Bryborn et al. |
| 7,639,250 B2 | 12/2009 | Xu et al. |
| 8,102,383 B2 | 1/2012 | Cohen et al. |
| 8,159,501 B2 | 4/2012 | Rao |
| 8,564,620 B2 | 10/2013 | Bellamy et al. |
| 8,670,623 B2 | 3/2014 | Oota |
| 8,718,375 B2 | 5/2014 | Ouyang et al. |
| 2005/0275622 A1 | 12/2005 | Patel et al. |
| 2008/0198146 A1 | 8/2008 | Bryborn et al. |
| 2009/0278848 A1 | 11/2009 | Robertson et al. |
| 2010/0100866 A1 | 4/2010 | Kamper et al. |
| 2010/0149109 A1 | 6/2010 | Elias |
| 2010/0251188 A1 | 9/2010 | Fu et al. |
| 2011/0185272 A1 | 7/2011 | Rajkumar |
| 2011/0279455 A1 | 11/2011 | McDaniel |
| 2012/0176416 A1 | 7/2012 | Dondurur et al. |
| 2012/0221938 A1 | 8/2012 | Patterson et al. |

FOREIGN PATENT DOCUMENTS

| | | |
|---|---|---|
| EP | 1519300 B1 | 7/2009 |
| EP | 1454225 B1 | 1/2013 |
| WO | 2012115853 A2 | 8/2012 |
| WO | 2014046302 A1 | 3/2014 |

\* cited by examiner

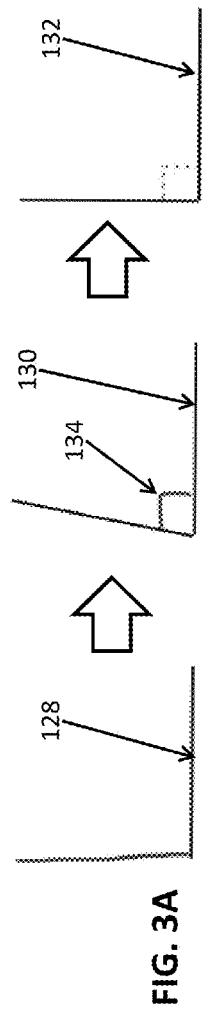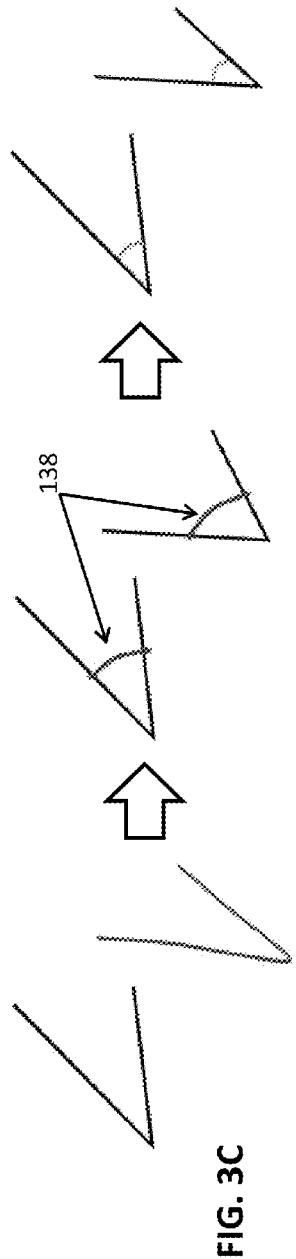
FIG. 3A
FIG. 3B
FIG. 3C

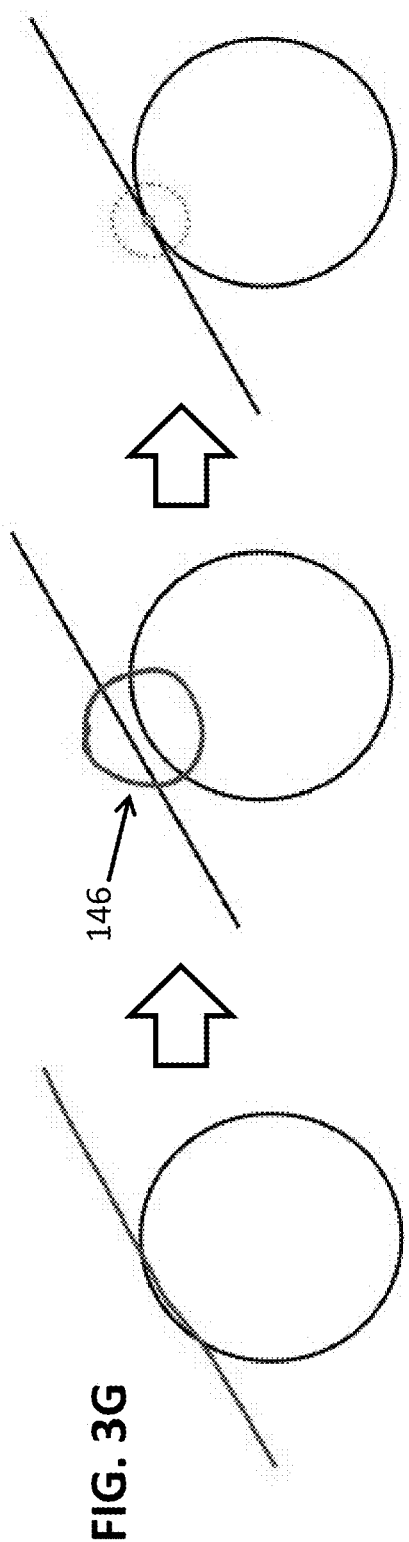

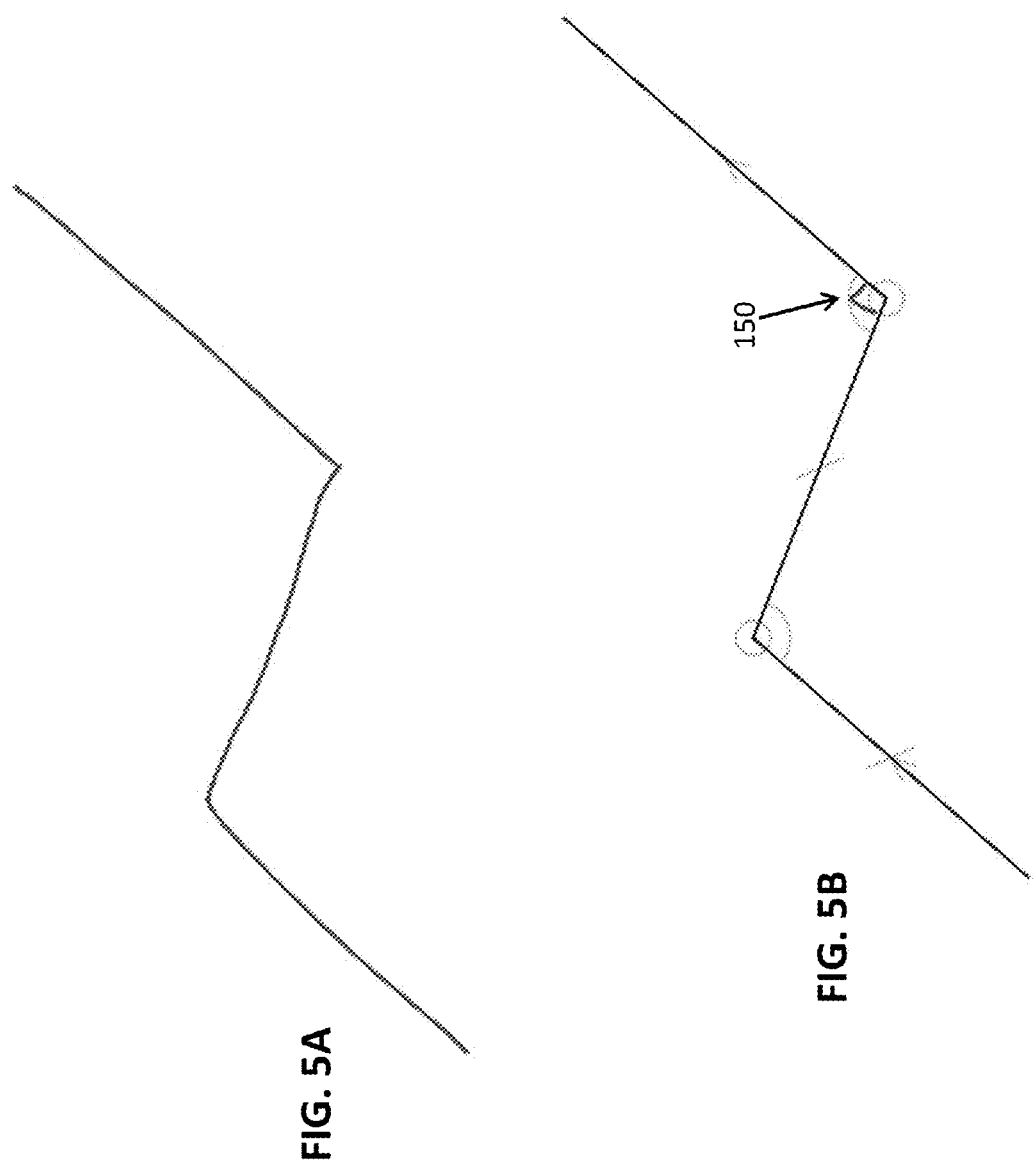

SYSTEM AND METHOD FOR RECOGNIZING GEOMETRIC SHAPES

TECHNICAL FIELD

The present invention relates generally to the field of computing device interfaces capable of recognizing user input of geometric shapes.

BACKGROUND

Computing devices continue to become more ubiquitous to daily life. Such devices take the form of computer desktops, laptops, tablet PCs, e-book readers, interactive whiteboards, mobile phones, smartphones, wearable computers, global positioning system (GPS) units, enterprise digital assistants (EDAs), personal digital assistants (PDAs), game consoles, and the like. Further, computing devices are being incorporated into cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The numerous varieties of computing devices as well as their subsequent uses necessitate a variety of input devices. One type of input device is a touch sensitive surface such as a touch screen or touch pad wherein user input is received through contact between the user's finger or an instrument such as a pen or stylus and the touch sensitive surface. Another type of input device is an input surface that senses motions made by a user above the input surface and without touching the input surface. Either of these methods of input can be used generally for drawing or inputting shapes. When the user input is a shape, the computing device must interpret the user's natural drawing technique using, for example, an on-line geometric shape recognition system or method.

Generally, on-line geometric shape recognition systems or methods monitor the initiation of a stroke, such as when the user contacts a touch sensitive surface (pen-down); the termination of a stroke, such as when the user stops contacting a touch sensitive surface (pen-up); and any movements (i.e. the stroke) the user makes with his or her finger or pen between the initiation and termination of the stroke.

On-line geometric shape recognition systems or methods may be classified as single-stroke or multi-stroke. Single-stroke recognition analyzes each single-stroke as a separate primitive. A primitive is a geometric shape. The system may only utilize single-stroke primitives or may utilize shorthand for primitives that would otherwise require multiple strokes. These single-stroke systems or methods typically have less input errors but may require users to memorize stroke patterns for multi-stroke primitives if shorthand is utilized. Multi-stroke recognition systems can recognize natural drawing and are more intuitive to users because one does not have to learn shorthand.

Whether one uses a single or multi-stroke system, on-line geometric shape recognition systems or methods usually consist of preprocessing, primitive recognition, and constraint solving. In practice, on-line geometric shape recognition systems or methods may include these steps along with additional steps. Further, on-line geometric shape recognition systems or methods may not clearly delineate each step or may perform the steps in an alternate order.

Preprocessing typically includes discarding irrelevant input data and normalizing, sampling, and removing noise from relevant data.

Primitive recognition specifies the different ways to break down the input data into individual lines, shapes, or other segments based on a set of basic models (e.g., lines, circles, ellipses, arcs, and points). Primitive recognition generally associates the segments with possible primitive candidates. Primitives can be any type of shape or curve, from basic (e.g., line segment, circle, ellipse, arc of circle, arc of ellipse, and point) to more complex (e.g., sinusoidal, spline, Bezier, and parametric function plots). Primitive candidates can comprise single-stroke, multi-stroke, and/or geometric variations of shapes. Primitive recognition may also be preceded by gesture determination that determines whether the input data is geometric shape or a gesture (e.g., an input stroke that provides additional information as to the relation of already input geometric shapes).

Constraint solving generally includes checking the primitives against a set of constraints (e.g., length equality, angle equality, parallelism, symmetry, alignment, tangency, connection, and perpendicularity). Typically, constraints are defined on a primitive level, meaning they are associated with specific primitives. Constraints can be implicit or explicit. Implicit constraints are such that the system infers a constraint based on user input of primitives. For example, the system or method may detect that two lines are close enough to being perpendicular and infer that a perpendicular restraint should apply, outputting two perpendicular lines. In this example, perpendicularity is an example of an implicit constraint. Explicit constraints are such that the user explicitly specifies additional constraints to apply. For instance, the system or method may not detect that two lines were intended to be perpendicular. A user may input an additional gesture to provide this explicit constraint. An on-line geometric shape recognition system or method may recognize both implicit and explicit constraints. Once the set of primitives and set of constraints are built, a constraint solving method enforces the maximum number of possible constraints. Following constraint solving, the on-line geometric shape recognition system or method outputs smooth geometric shapes.

Constraint solving at the primitive level is usually limited in the number of primitives and constraints that a system can analyze because constraints are generally defined at the primitive level and closely linked to primitive types. Each new primitive or constraint introduced into the system causes exponentially more relationships between primitives and constraints, creating exponentially more possibilities to analyze during constraint solving.

The present system and method provides improved results for user input recognition by defining the constraints at a vector component level rather than primitive level. By defining constraints on the vector component level, the system and method is able to better handle increasingly large sets of primitives and constraints.

SUMMARY

The examples of the present invention that are described herein below provide methods, systems, and software for use in on-line geometric shape recognition. These permit a user to enter geometric shapes into a computing device as one would on a piece of paper. The present shape recognition system and method includes a computing device connected to an input device in the form of an input surface. A user is able to provide input by applying pressure to or gesturing above the input surface using either his or her finger or an instrument such as a stylus or pen. The present system and method monitors the input strokes. After preprocessing the input strokes, the present system and method determines whether or not the input stroke is a gesture. If the input stroke is a gesture, the present system and method matches the gesture with an instruction (e.g., add an additional constraint or delete a drawing) to apply to a preexisting drawing. If the input is not a gesture, the present system and method determines which primitive closely matches the input stroke. Finally, the present system and method applies the set of constraints to the set of primitives to output smooth geometric shapes. After the output is displayed as a drawing on the output device, the user may proceed to adjust or otherwise enrich the output drawing with more shapes or constraints.

An object of the disclosed system and method is to provide an on-line geometric shape recognition system and method that can interpret a user's natural drawing style and output cleaned-up geometric shapes. This can be done by providing a system and method whereby the input strokes are associated with either primitives or gestures that the user can use to explicitly define constraints. Using the primitives and constraints associated with the user input, the system is able to output smooth geometric shapes.

Yet a further object of the disclosed system and method is to provide a simpler definition of constraints. This can be done by providing a system and method that defines constraints on a vector component level rather than on a primitive level.

Another object of the disclosed system and method is to relate primitives and constraints at the vector component level. This can be done by providing a system and method that breaks down primitives into sets of vector components and analyzes the relationship between the constraints and primitives at the vector component level.

An object of the disclosed system and method is also to provide an on-line geometric shape recognition system and method that allows further editing of the output. This can be done by providing a system and method that recognizes certain input editing gestures.

The present system and method will be more fully understood from the following detailed description of the examples thereof, taken together with the drawings.

BRIEF DESCRIPTION OF THE DRAWINGS

FIG. 3A shows a pictorial illustration of a possible perpendicularity constraint in accordance with an example of the present system.

FIG. 3B shows a pictorial illustration of a possible length equality constraint in accordance with an example of the present system.

FIG. 3C shows a pictorial illustration of a possible angle equality constraint in accordance with an example of the present system.

FIG. 3G shows a pictorial illustration of a possible junction constraint involving a line segment and a portion of a circle in accordance with an example of the present system.

FIG. 5A shows a pictorial illustration of a possible user input in accordance with an example of the present system.

FIG. 5B shows a pictorial illustration of a possible output with possible additional user input in accordance with an example of the present system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies described herein generally relate to on-line geometric shape recognition. The system and method described herein may be used to recognize a user's natural drawing style input through the processes of primitive recognition and constraint solving. The process of constraint solving can include the breaking down and comparison of primitives and constraints at the vector component level.

Figure 1:
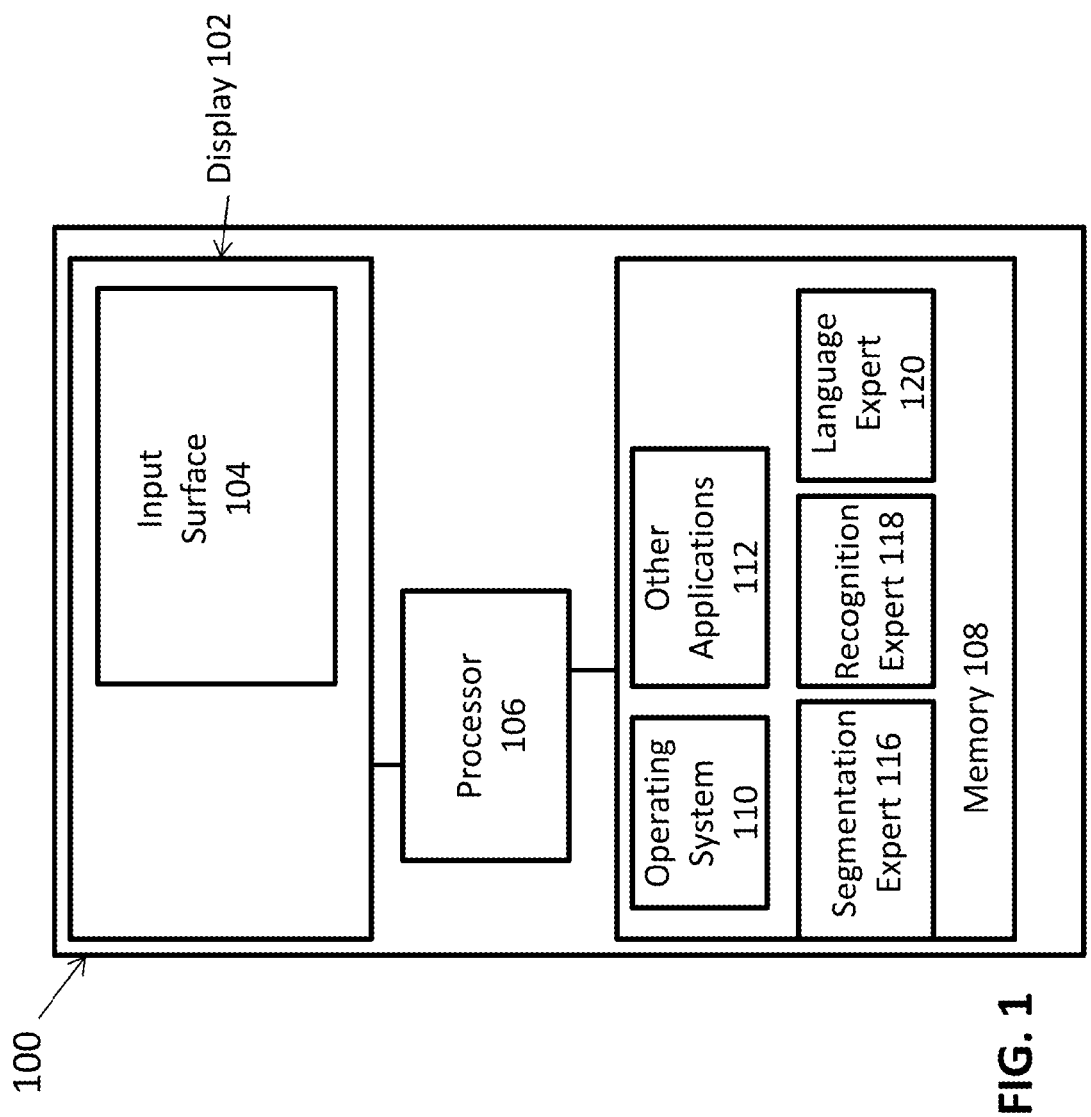
FIG. 1 shows a block diagram of a computing device in accordance with an example of the present system.

FIG. 1 shows a block diagram of an exemplary computing device 100. The computing device may be a computer desktop, laptop, tablet PC, e-book reader, mobile phone, smartphone, wearable computer, digital watch, interactive whiteboard, global positioning system (GPS) unit, enterprise digital assistant (EDA), personal digital assistant (PDA), game console, or the like. Device 100 includes at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The device 100 includes at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art. The input surface 104 may be bounded by a permanent or video-generated border that clearly identifies its boundaries.

In addition to the input surface 104, the device 100 may include one or more additional I/O devices (or peripherals) that are communicatively coupled via a local interface. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

One such I/O device may be at least one display 102 for outputting data from the computing device such as images, text, and video. The display 102 may use LCD, plasma, CRT, or any other appropriate technology as known to those of ordinary skill in the art. At least some or all of display 102 may be co-located with the input surface 104. Other additional I/O devices may include input devices such as a keyboard, mouse, scanner, microphone, touchpads, bar code readers, laser readers, radio-frequency device readers, or any other appropriate technology known to those of ordinary skill in the art. Furthermore, the I/O devices may also include output devices such as a printer, bar code printers, or any other appropriate technology known to those of ordinary skill in the art. Finally, the I/O devices may further include devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art.

The device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 can include any one or a combination of volatile memory elements (e.g., random access memory (RAM, such as DRAM, SRAM, SDRAM, etc.)) and non-volatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), etc.). Moreover, memory 108 may incorporate electronic, magnetic, optical, and/or other types of storage media. The memory 108 can have a distributed architecture where various components are situated remote from one another but can also be accessed by the processor 106. The memory 108 is coupled to a processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in memory 108 includes the on-line geometric shape recognition computer program, which may include one or more separate programs, each of which comprises an ordered listing of executable instructions for implementing logical functions. The operating system 110 controls the execution of the on-line geometric shape recognition computer program. The operating system 110 may be any proprietary operating system or a commercially available operating system, such as WEBOS, WINDOWS®, MAC and IPHONE OS®, LINUX, and ANDROID. It is understood that other operating systems may also be utilized without departing from the spirit of the system and method disclosed herein.

The memory 108 may include other application programs 112 related to geometric shape recognition as described herein, totally different functions, or both. The applications 112 include programs provided with the device 100 upon manufacture and may further include programs downloaded into the device 100 after manufacture. Some examples include a text editor, telephone dialer, contacts directory, instant messaging facility, computer-aided design (CAD) program, email program, word processing program, web browser, and camera.

The on-line geometric shape recognition computer program with support and compliance capabilities may be a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system. Furthermore, the on-line geometric shape recognition computer program with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, and Ada; or (c) functional programming languages for example but no limited to Hope, Rex, Common Lisp, Scheme, Clojure, Racket, Erlang, OCaml, Haskell, and F#.

The system may be initiated when processor 106 detects a user entered stroke via the input surface 104. The user may enter a stroke with a finger or some instrument such as a pen or stylus. The user may also enter a stroke by making gesture above input surface 104 if technology that senses motions above input surface 104 is being used. A stroke is characterized by at least the stroke initiation location, the stroke termination location, and the path upon which the user connects the stroke initiation and termination locations.

Figure 2:
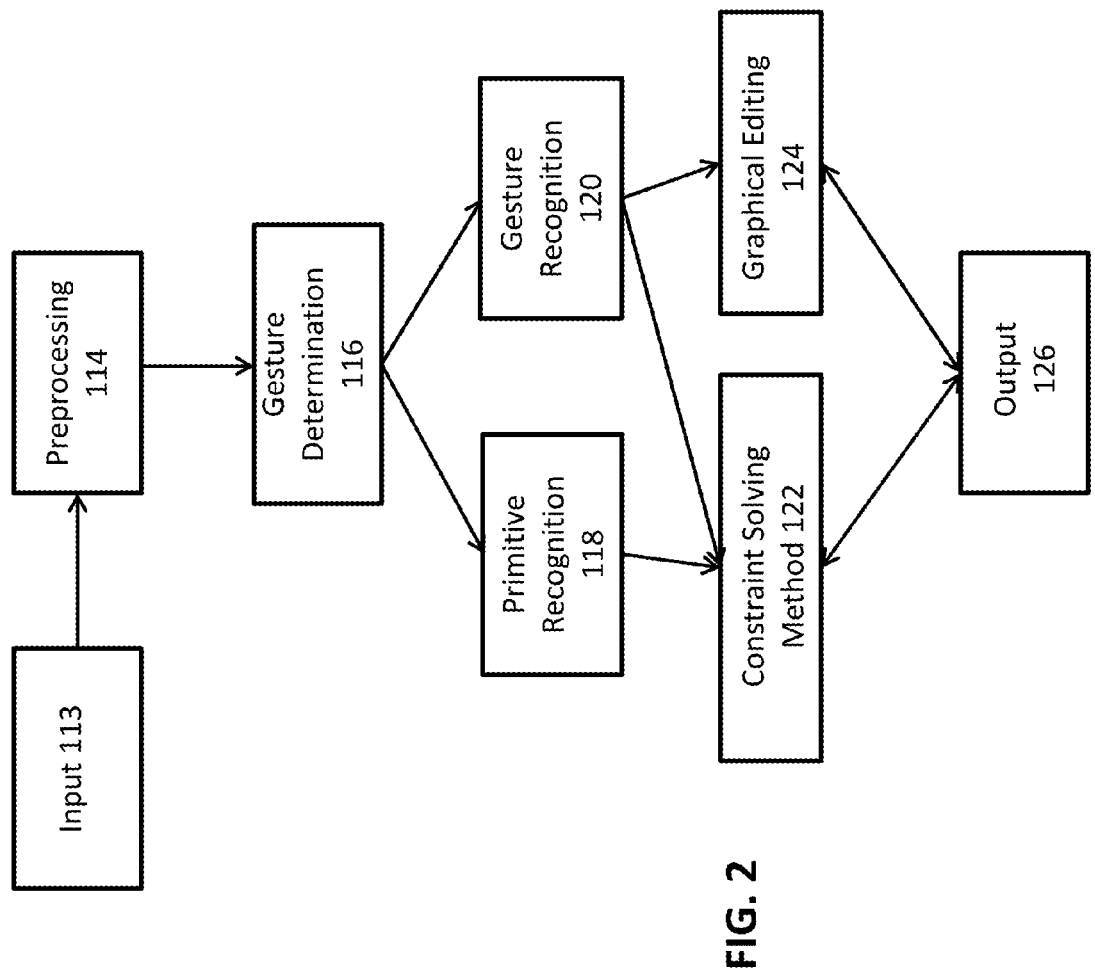
FIG. 2 shows a block diagram of a system for on-line geometric shape recognition in accordance with an example of the present system.
Figure 3D:
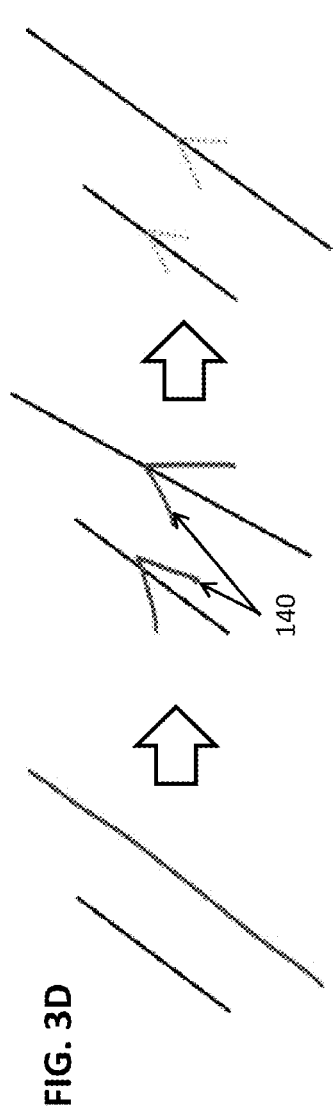
FIG. 3D shows a pictorial illustration of a possible parallelism constraint in accordance with an example of the present system.
Figure 3E:
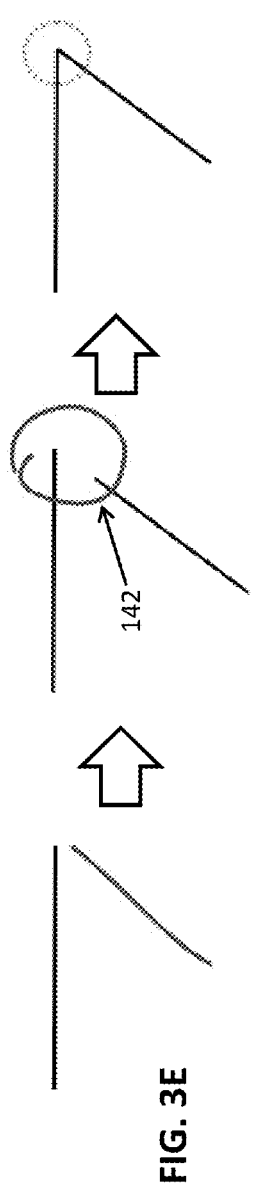
FIG. 3E shows a pictorial illustration of a possible junction constraint involving ends of line segments in accordance with an example of the present system.
Figure 3F:
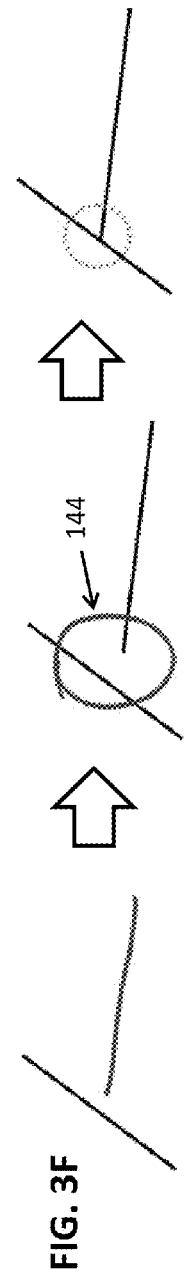
FIG. 3F shows a pictorial illustration of a possible junction constraint involving the end of a line segment and line segment in accordance with an example of the present system.

FIG. 2 is a schematic pictorial of a system for on-line geometric shape recognition in accordance with an example of the present system. Once initiated with at least one input stroke 113, the system preprocesses 114 the strokes. Preprocessing 114 can include normalizing the path connecting the stroke initiation and termination locations by applying size normalization and/or methods such as B-spline approximation to smooth the input.

After preprocessing, the system determines whether the stroke is a gesture or not in the context of an existing drawing. A gesture is an input stroke that provides additional information regarding the existing drawing. If the gesture determination 116 recognizes a gesture, the system then passes the input to gesture recognition 120. The system may then recognize the input as an annotation defining an explicit constraint the user may wish to impose on existing geometric shapes. In one embodiment, the gesture recognition 120 may use manually tuned heuristics based on polyline approximation of the gesture strokes and their position compared to the primitives to detect the gestures and distinguish between them in context of the existing drawing. However, any gesture recognition 120 method known to those of ordinary skill in the art may be used. The recognized gesture is passed on to the constraint solving method 122. The constraint solving method 122 will be discussed below. The gesture may also be associated with graphical editing instructions. In this case, the gesture is passed onto the graphical editing 124.

The graphical editing 124 may be any method known to those of ordinary skill in the art to edit existing output 126. Such graphical editing 124 typically uses information from the gesture recognition 120 and the output 126 to adjust the current drawing by erasing it, filling in shapes with patterns or colors, changing the thickness or highlighting certain lines, or otherwise editing the current output 126 in ways known to those of ordinary skill in the art.

If gesture determination 116 does not detect a gesture, the input is passed to the primitive recognition 118. Primitives may include the basic geometric shapes (e.g., line segment, circle, ellipse, arc of circle, arc of ellipse, and point) or additionally more complex shapes (e.g., sinusoidal, spline, Bezier, and parametric function plots). The system may also define a "junk" primitive, which cause the system to discard the input as an unrecognized primitive. Depending on the number of primitives defined in the system, primitive recognition 118 may include single-stroke primitive recognition that treats each stroke as a separate primitive to process. Primitive recognition 118 may also include multi-stroke recognition that treats multiple consecutive input strokes as single primitive.

The system may employ any combination of single and multi-stroke recognition methods known to those of ordinary skill in the art to determine which primitive most closely matches the input 113. One example of primitive recognition 118 is to fit the input 113 with all primitives, giving a score for each fitting attempt. Dynamic programming may then be used to select the best set of primitives to encompass all of the input strokes based on the best overall fitting scores. Once the best set of primitives has been chosen, the set of primitives is sent to the constraint solving method 122.

The constraint solving method 122 may receive input from the primitive recognition 118, gesture recognition 120, and/or output 126. Constraints link primitives together (e.g., length equality, angle equality, parallelism, symmetry, alignment, tangency, connection, and perpendicularity). FIGS. 3A-3G are pictorial illustrations of possible constraints. In each case, the far left illustration is the input 113 and the far right illustration is the output 126. The middle illustration is the application of constraints by the constraint solving method 122. Constraints can be implicit, deduced by the constraint solving method 122 depending on the primitives provided by the primitive recognition 118, or can be explicit, defined by the user through gestures. For instance, the constraint solving method 122 may deduce the two line segments input 128 by the user in FIG. 3A were intended to be perpendicular and automatically apply the perpendicularity constraint, outputting 132 the far right illustration of FIG. 3A. In this example, the middle illustration 130 represents the constraint solving method 122 adding the perpendicularity constraint internally.

In another instance, the constraint solving method 122 may not detect that the user intended two perpendicular line segments in FIG. 3A and output the non-perpendicular line segments in the middle illustration 130. The user may then annotate the junction of the two line segments with a square 134, which the system would recognize as a gesture. The gesture recognition 120 would pass this gesture onto the constraint solving method 122, which would adjust the output to be two perpendicular line segments, as seen in the output 132 of far right illustration in FIG. 3A.

In FIGS. 3A-3G, the constraints can be deduced by the constraint solving method 122 or explicitly annotated by the user. The annotations of these figures (i.e., a square 134 for perpendicularity in FIG. 3A, two small line segments 136 for length equality in FIG. 3B, two arcs 138 for angle equality in FIG. 3C, two arrows 140 for parallelism in FIG. 3D, a circle 142 around the ends of line segments to form an junction in FIG. 3E, a circle 144 around the end of a line segment and line segment to form a junction in FIG. 3F, and a circle 146 around a line segment and portion of a circle for a junction or tangency in FIG. 3G) are one embodiment, and the present system and method may use any gestures for these constraints as well as others. Further, constraints naturally associated with primitives may be deduced during primitive recognition 118 prior to the constraint solving method 122. For instance, the primitive recognition 118 may recognize a square from the input and also apply the constraints of four equal sides, four internal right angles, and parallel opposite sides. If primitive recognition 118 recognizes a polyline, it may also apply the junction constraint where the lines intersect. However, for clarity this specification will only refer to the constraint solving method 122 as applying all constraints even though it is envisioned that the primitive recognition 118 may handle this function in some situations.

The constraint solving method 122 includes defining constraints and primitives at the vector component level rather than at a primitive level. When defining constraints at the primitive level, constraints are associated with specific primitives. However, by defining constraints at the vector component level a user may add additional constraints and primitives without adding exponentially more work. For example, when the junction constraint is defined and applied at the primitive level with two line segments, it must first be associated with the beginning or ending of a line segment. Once a circle primitive is added to the present system and method, the junction constraint must also be associated with the circle center together with other line segment externalities. This constraint becomes even more complicated once ellipses and other more complex primitives are added to the present system and method, even though the constraint is still defining just a junction between two points.

To avoid this exponential increase in complexity, the constraint solving method 122 breaks to down both primitives and constraints at the vector component level, such that the method focuses on the relationships between points. In one embodiment, the constraint solving method 122 may define at least three items: points, lengths, and slope angles. To define primitives as items, the constraint solving method 122 may break down the primitives into their items. For example, a line segment primitive may be defined by the two extremity points, a slope, and a length. Another example is a circle primitive defined by a central point and radius length. With the primitives broken down to their items, the constraint solving method 122 applies vector component constraints. Even though the constraint solving method 122 may include breaking down the primitives into their vector component items, in other embodiments, the primitive recognition 118 may break down the primitives into the vector components prior to passing the information to the constraint solving method 122. In this alternative embodiment, the primitive items from the primitive recognitions 118 would still have constraints applied to them by the constraint solving method 122.

Unlike constraints defined on the primitive level, constraints defined at the vector component level link items together. Vector component constraints may include:

Slope Angle Constraint defined between two points and one slope angle;

Length Constraint defined between two points (A, B) and one length (L) so that $\|AB\|=L$;

Projection Constraint defined between two points (A, B), a length (L) and a slope(s) so that B is the projection of A following slope(s) at distance (L) and vice-versa;

Junction Constraint defined between two points (A, B) to ensure A=B;

Slope Angle Difference Constraint defined between two slope angles (s1, s2) and a given value (v) so that s2−s1=v;

Length Ratio Constraint defined between two lengths (L1, L2) and a given value (r) so that L1/L2=r;

Length Sum Constraint defined between three points (A, B, C) and one length (L) so that $\|AC\|+\|BC\|=L$; and Existence Constraint defined for any point, and useful if it is isolated and not linked by any other constraint Other constraints may be defined in a similar manner as would be known to those of skill in the art. Further, any constraint may be defined as a combination of vector component constraints. One benefit of using vector component constraints is that the constraint solving method 122 may deduce the value of an item if some of the other items are known. As an example, the Length Constraint links two point items (A, B) to a length item L. So, if A and B are known, the value of L can be determined. Conversely, if A and L are known, B can be defined as on a circle of radius L centered on A, which information is added to the intersection parameter of B. The same applies if we switch A and B. By breaking down both primitives and constraints on a vector component level the present system and method will be able to solve more situations.

Once the constraint solving method 122 has broken down the primitives into items, the constraint solving method 122 may apply all possible constraints to the primitives or may build a list of specific constraints based on priority. By placing constraints in a hierarchy, the constraint solving method 122 avoids applying contradictory constraints. For instance, constraints that maintain primitive integrity may be high priority. This ensures that primitives do not change their inherent shape (e.g., circles will remain a point and a radius). A second priority may constraints that the constraint solving method 122 implicit in the primitives such as a junction of a polyline. Other lower priority constraints may be those defined explicitly by the user (e.g., user defined parallelism) or those for pairs of primitives (e.g., a line segment tangentially intersecting to a circle). However, this hierarchy is only one example, and the present system and method is able to prioritize constraints in any manner one skilled in the art would necessitate. After the constraint solving method 122 applies the proper constraints to the primitives, it rebuilds the primitives from their vector component levels to produce output 126 in the form of smooth geometric shapes.

Figure 4A:
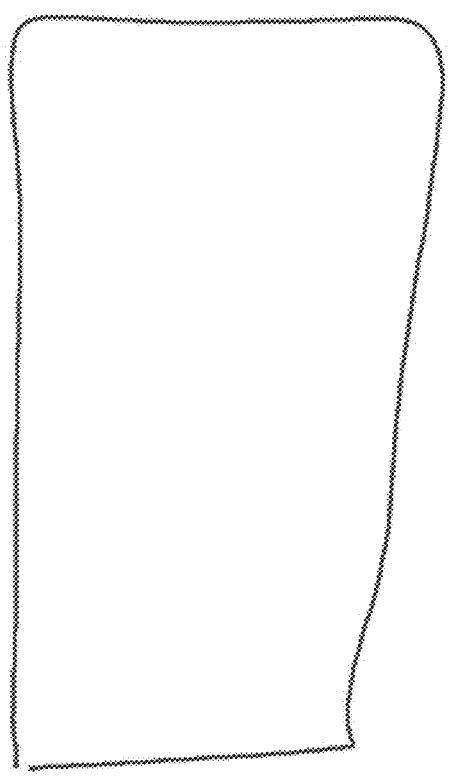
FIG. 4A shows a pictorial illustration of a possible user input in accordance with an example of the present system.
Figure 4B:
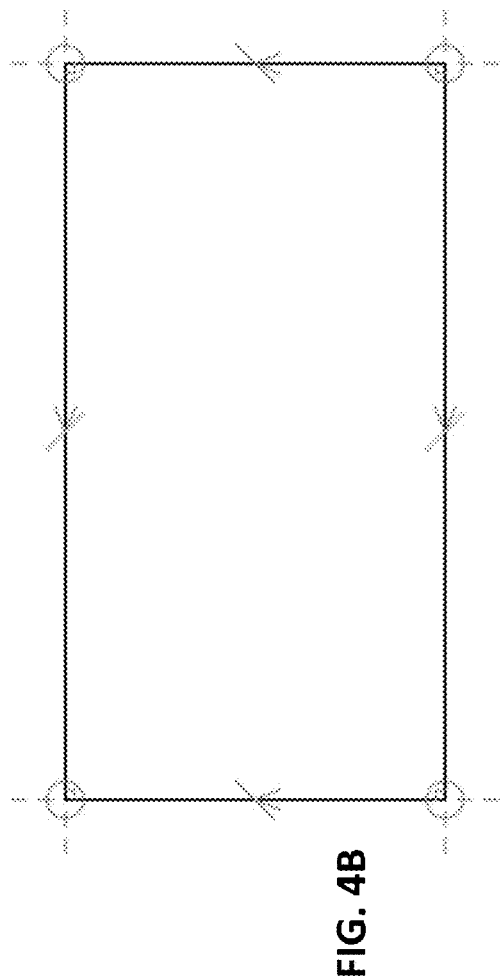
FIG. 4B shows a pictorial illustration of a possible output in accordance with an example of the present system.

FIGS. 4A-4F show a schematic pictorial illustration of possible inputs and outputs relating to a rectangle and polyline in accordance with an example of the present system. FIG. 4A shows a schematic illustration of an input of a rectangle. After preprocessing 114, the gesture determination 116 would not define this input as a gesture and pass the input on for primitive recognition 118. After primitive recognition 118 determined the input was a rectangle, the information would be passed on to the constraint solving method 122. The constraint solving method 122 would apply the constraints known for a rectangle (e.g., four line segments that intersect at four interior right angles, and opposite sides are parallel and of equal length). This would produce the rectangle shown in FIG. 4B as output.

Figure 4C:
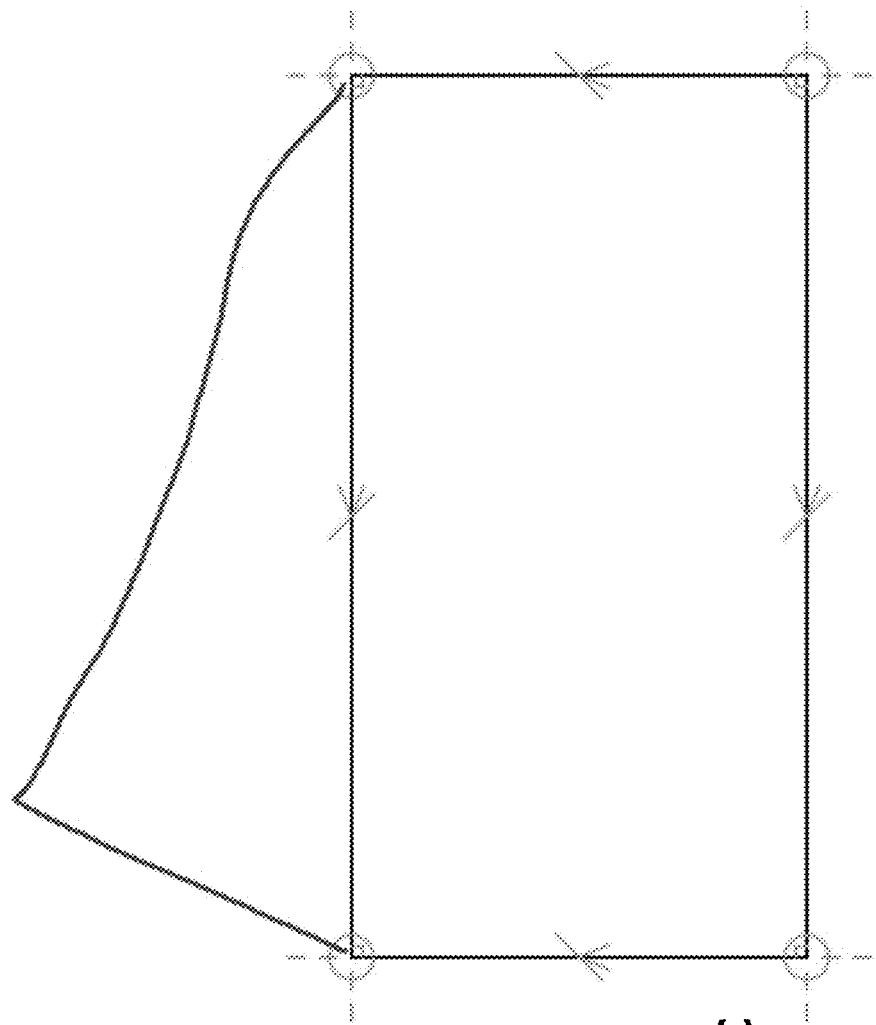
FIG. 4C shows a pictorial illustration of a possible output with possible additional user input in accordance with an example of the present system.
Figure 4D:
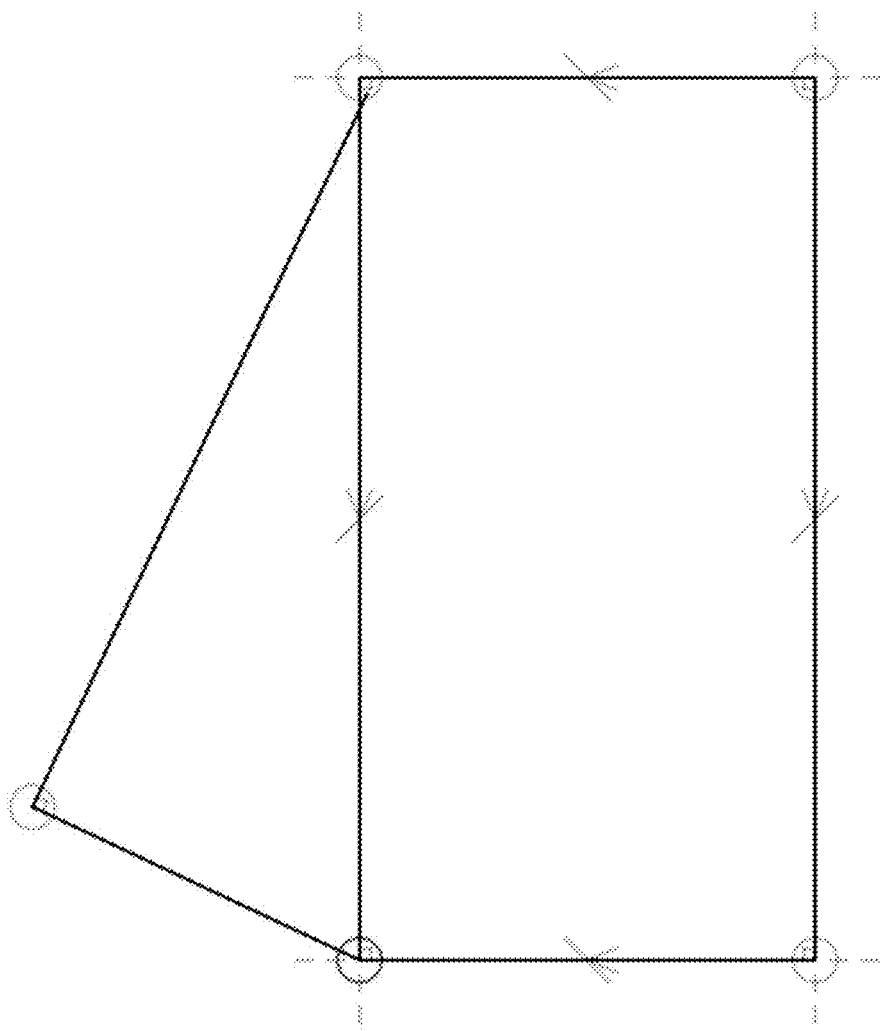
FIG. 4D shows a pictorial illustration of a possible output in accordance with an example of the present system.
Figure 4E:
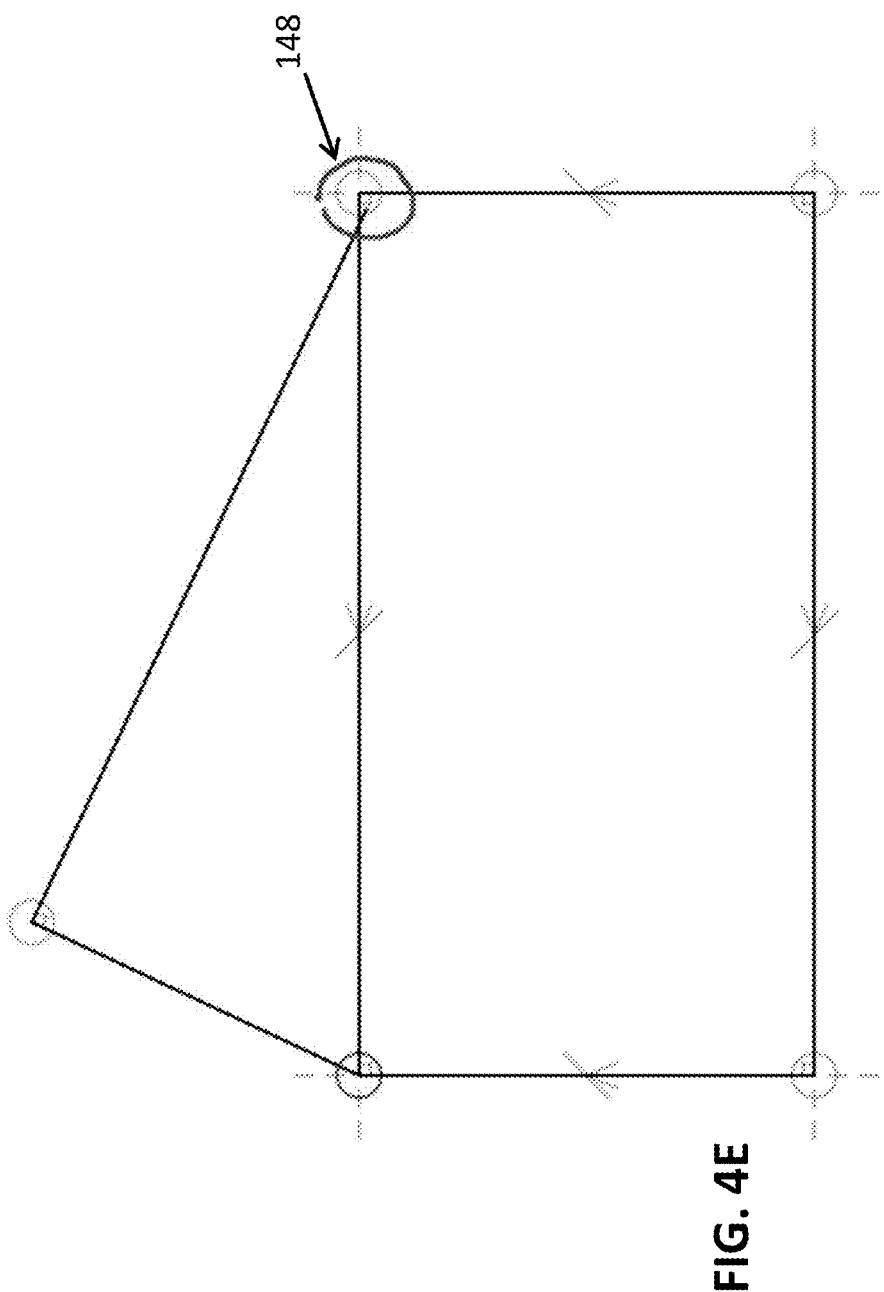
FIG. 4E shows a pictorial illustration of a possible output with possible additional user input in accordance with an example of the present system.
Figure 4F:
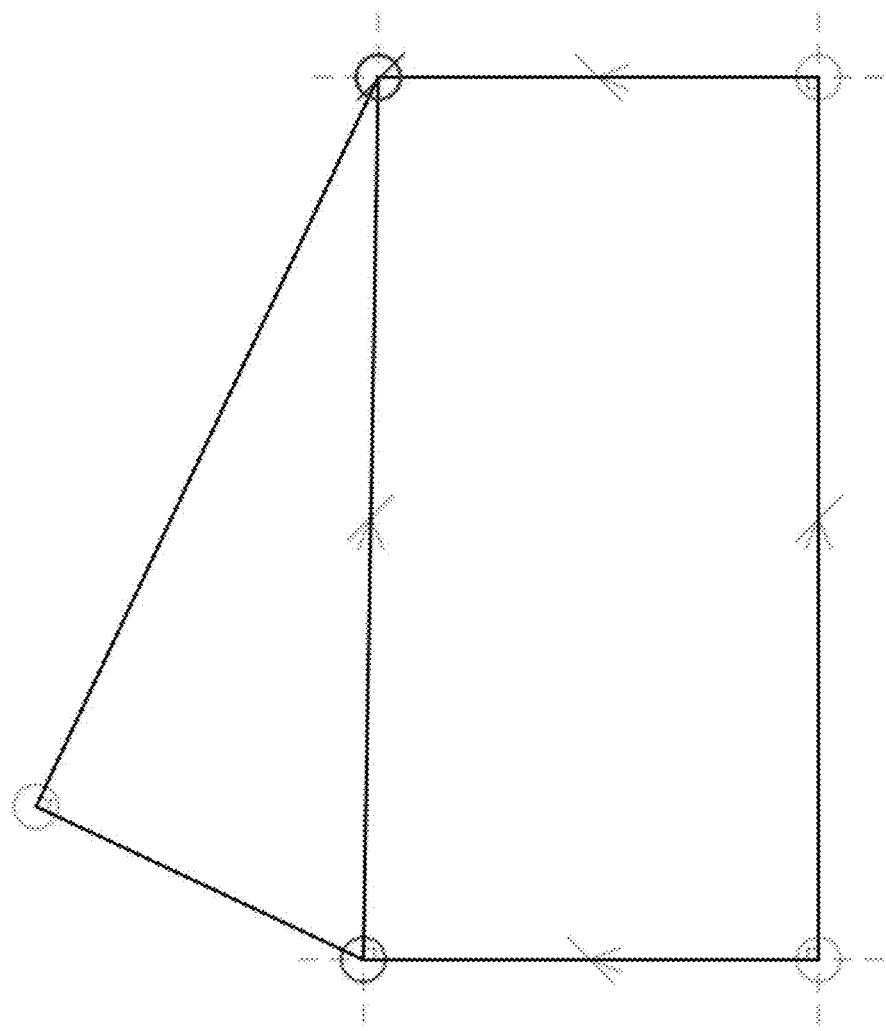
FIG. 4F shows a pictorial illustration of a possible output in accordance with an example of the present system.

A user may further add to the rectangle with input shown FIG. 4C. The primitive recognition 118 would recognize this as a polyline primitive. The constraint solving mechanism 122 would also detect a junction in the middle of the new polyline that is a right angle as well as junction with corner of the previous rectangle. This would produce new output shown in FIG. 4D. A user may want another junction that was not detected and add annotation 148 to the output as shown in FIG. 4E. This annotation 148 would be processed as a gesture, recognized as a gesture to indicate a junction, and passed on to the constraint solving method 122. The constraint solving method would take output along with this gesture and all other relevant constraints to produce new output shown in FIG. 4F.

Figure 5C:
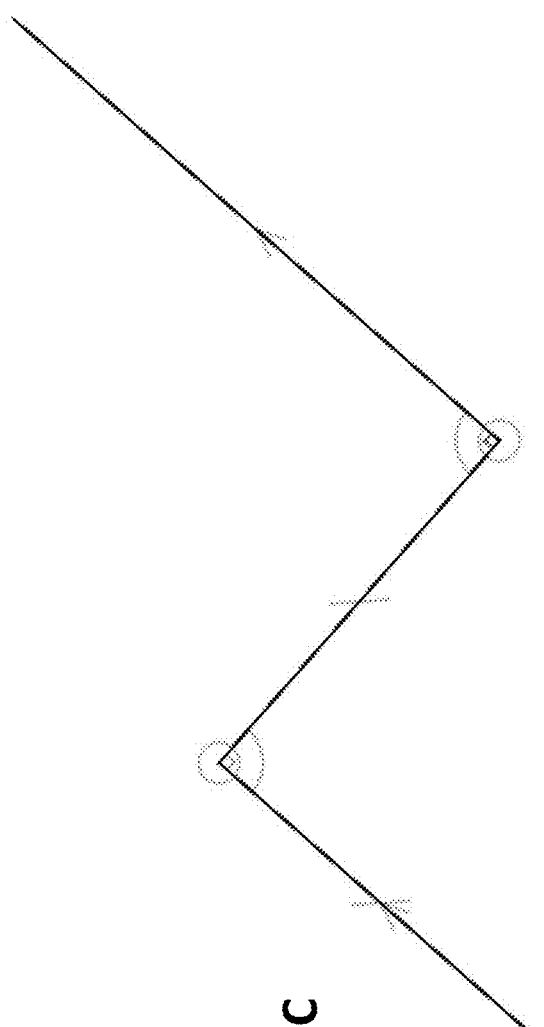
FIG. 5C shows a pictorial illustration of a possible output in accordance with an example of the present system.

FIGS. 5A-5C show a schematic pictorial illustration of possible input and output relating to a polyline in accordance with an example of the present system. FIG. 5A shows a schematic illustration of an input of a polyline. After preprocessing 114, the gesture determination 116 would not define this input as a gesture and pass the input on for primitive recognition 118. After primitive recognition 118 determined the input was a polyline, the information would be passed on to the constraint solving method 122. The constraint solving method 122 would apply the constraints detected by in the primitive polyline: two junctions between three line segments, parallelism between the first and third line segments, the corresponding angle quality between the two angles, and length equality between the first and second line segments. This would produce the polyline output shown in FIG. 5B as output. A user may further indicate perpendicularity as shown with the additional small box annotation 150 on the second angle shown FIG. 5B. This annotation 150 would be processed as a gesture, recognized as a gesture to indicate perpendicularity, and passed on to the constraint solving method 122. The constraint solving method would take output along with this gesture and all other relevant constraints to produce new output shown in FIG. 5C.

Through the present on-line geometric shape recognition system and method, the best results for user input drawing recognition are provided by breaking down primitives and constraints on a vector component level. By applying constraints to primitives on the vector component level and rebuilding the altered primitives for output, the present on-line geometric shape recognition system and method is able to handle more primitives and constraints without an exponential increase in difficulty.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A non-transitory computer readable medium having a computer readable program code embodied therein, said computer readable program code adapted to be executed to implement a method for providing geometric shape recognition for at least one input stroke, said method comprising:
  recognizing at least one primitive that corresponds to at least one input stroke;
  applying at least one constraint to the at least one primitive, wherein the at least one constraint and at least one primitive are applied on a vector component level; and
  providing an output based on the application of the at least one constraint to the at least one primitive,
  wherein if the at least one constraint comprises multiple constraints, the multiple constraints are applied to the at least one primitive based on a priority order, wherein the priority order comprises constraints maintaining the at least one primitive's integrity, constraints implicit in the at least one primitive, and constraints defined by a gesture.

2. The non-transitory computer readable medium according to claim 1, wherein the at least one primitive comprises a plurality of input strokes.

3. The non-transitory computer readable medium according to claim 1, wherein the at least one input stroke is at least one user gesture made above an input surface.

4. The non-transitory computer readable medium according to claim 1, wherein the at least one input stroke is preprocessed, wherein the preprocessing includes at least the normalization and smoothing of the at least one input stroke.

5. The non-transitory computer readable medium according to claim 4, wherein the at least one primitive is defined on the vector component level as being constituted of at least one point, length, or slope angle.

6. The non-transitory computer readable medium according to claim 5, wherein the at least one constraint is defined on the vector component level as applying to at least one point, length, or slope angle.

7. The non-transitory computer readable medium according to claim 6, wherein the at least one constraint to apply to the at least one primitive is associated with the at least one primitive.

8. The non-transitory computer readable medium according to claim 4, wherein the preprocessed at least one input stroke is analyzed to determine whether the at least one input stroke is a gesture, wherein if the at least one input stroke is a gesture, the gesture can provide at least one further constraint to the output based on the application of the at least one constraint to the at least one primitive.

9. The non-transitory computer readable medium according to claim 8, wherein the gesture provides graphical editing instructions to apply to the output based on the application of the at least one constraint to the at least one primitive.

10. The non-transitory computer readable medium according to claim 9, wherein the graphical editing instructions comprise at least a deletion instruction.

11. The non-transitory computer readable medium according to claim 1, wherein the possible at least one constraint comprises at least one of length equality, angle equality, parallelism, symmetry, alignment, tangency, connection, and perpendicularity.

12. The computer program product according to claim 1, wherein the possible at least one constraint comprises at least one of Slope Angle Constraint, Length Constraint, Projection Constraint, Junction Constraint, Slope Angle Difference Constraint, Length Ratio Constraint, Length Sum Constraint, or Existence Constraint.

13. The non-transitory computer readable medium according to claim 1, wherein the at least one primitive comprises at least one of a line segment, circle, ellipse, arc of circle, arc of ellipse, and point.

14. A method for providing geometric shape recognition for at least one input stroke on a computing device, the computing device comprising a processor and at least one non-transitory computer readable medium under control of the processor, said method comprising:
  recognizing, by the at least one non-transitory computer readable medium, at least one primitive that corresponds to at least one input stroke;
  applying, by the at least one non-transitory computer readable medium, at least one constraint to the at least one primitive, wherein the at least one constraint and at least one primitive are applied on a vector component level; and
  providing, by the at least one non-transitory computer readable medium, an output based on the application of the at least one constraint to the at least one primitive,
  wherein if the at least one constraint comprises multiple constraints, the multiple constraints are applied to the at least one primitive based on a priority order, wherein the priority order comprises constraints maintaining the at least one primitive's integrity, constraints implicit in the at least one primitive, and constraints defined by a gesture.

15. The method according to claim 14, wherein the at least one primitive comprises a plurality of input strokes.

16. The method according to claim 14, wherein the at least one input stroke is at least one user gesture made above an input surface.

17. The method according to claim 14, wherein the at least one input stroke is preprocessed by the at least one non-transitory computer readable medium, wherein the preprocessing includes at least the normalization and smoothing of the at least one input stroke.

18. The method according to claim 17, wherein the at least one primitive is defined on the vector component level as being constituted of at least one point, length, or slope angle.

19. The method according to claim 18, wherein the at least one constraint is defined on the vector component level as applying to at least one point, length, or slope angle.

20. The method according to claim 19, wherein the at least one constraint to apply to the at least one primitive is associated with the at least one primitive.

21. The method according to claim 17, wherein the preprocessed at least one input stroke is analyzed to determine whether the at least one input stroke is a gesture, wherein if the at least one input stroke is a gesture, the gesture can provide at least one further constraint to the output based on the application of the at least one constraint to the at least one primitive.

22. The method according to claim 21, wherein the gesture provides graphical editing instructions to apply to the output based on the application of the at least one constraint to the at least one primitive.

23. The method according to claim 22, wherein the graphical editing instructions comprise at least a deletion instruction.

24. The method according to claim 14, wherein the possible at least one constraint comprises at least one of length equality, angle equality, parallelism, symmetry, alignment, tangency, connection, and perpendicularity.

25. The method according to claim 14, wherein the possible at least one constraint comprises at least one of Slope Angle Constraint, Length Constraint, Projection Constraint, Junction Constraint, Slope Angle Difference Constraint, Length Ratio Constraint, Length Sum Constraint, or Existence Constraint.

26. The method according to claim 14, wherein the at least one primitive comprises at least one of a line segment, circle, ellipse, arc of circle, arc of ellipse, and point.

27. A non-transitory computer readable medium having a computer readable program code embodied therein, said computer readable program code adapted to be executed to implement a method for providing geometric shape recognition for at least one input stroke, said method comprising:
preprocessing at least one input stroke;
analyzing the preprocessed the at least one input stroke to determine whether the at least one input stroke is a gesture:
wherein if the at least one input stroke is not a gesture:
recognizing at least one primitive that corresponds to the at least one input stroke;
applying at least one constraint to the at least one primitive, wherein the at least one constraint and the at least one primitive are applied on the vector component level;
wherein if the at least one input stroke is a gesture, the gesture provides at least one further constraint to an output based on the application of the at least one constraint to the at least one primitive, wherein the at least one constraint and the at least one primitive are applied on the vector component level; and
providing an output based on the application of the at least one constraint to the at least one primitive,
wherein if the at least one constraint comprises multiple constraints, the multiple constraints are applied to the at least one primitive based on a priority order, wherein the priority order comprises constraints maintaining the at least one primitive's integrity, constraints implicit in the at least one primitive, and constraints defined by a gesture.

28. The non-transitory computer readable medium according to claim 27, wherein the at least one primitive comprises a plurality of input strokes.

29. The non-transitory computer readable medium according to claim 28, wherein the at least one primitive is defined on the vector component level as being constituted of at least one point, length, or slope angle.

30. The non-transitory computer readable medium according to claim 29, wherein the at least one constraint is defined on the vector component level as applying to at least one point, length, or slope angle.

31. The non-transitory computer readable medium according to claim 30, wherein the at least one constraint to apply to the at least one primitive is associated with the at least one primitive.

32. The non-transitory computer readable medium according to claim 30, wherein the gesture provides graphical editing instructions to apply to the output based on the application of the at least one constraint to the at least one primitive.

33. The non-transitory computer readable medium according to claim 32, wherein the graphical editing instructions comprise at least a deletion instruction.

34. The non-transitory computer readable medium according to claim 27, wherein the at least one input stroke is at least one user gesture made above an input surface.

35. The non-transitory computer readable medium according to claim 27, wherein the possible at least one constraint comprises at least one of length equality, angle equality, parallelism, symmetry, alignment, tangency, connection, and perpendicularity.

36. The non-transitory computer readable medium according to claim 27, wherein the possible at least one constraint comprises at least one of Slope Angle Constraint, Length Constraint, Projection Constraint, Junction Constraint, Slope Angle Difference Constraint, Length Ratio Constraint, Length Sum Constraint, or Existence Constraint.

37. The non-transitory computer readable medium according to claim 27, wherein the at least one primitive comprises at least one of a line segment, circle, ellipse, arc of circle, arc of ellipse, and point.

* * * * *

UNITED STATES PATENT AND TRADEMARK OFFICE
CERTIFICATE OF CORRECTION

PATENT NO. : 9,489,572 B2  
APPLICATION NO. : 14/558181  
DATED : November 8, 2016  
INVENTOR(S) : Robin Mélinand et al.

Page 1 of 1

It is certified that error appears in the above-identified patent and that said Letters Patent is hereby corrected as shown below:

On the Title Page

Item (71) Applicant should read -- MyScript -- rather than "(Vision Objects)"

Signed and Sealed this  
Fourteenth Day of March, 2017

Michelle K. Lee  
*Director of the United States Patent and Trademark Office*